United States Patent
Järvinen et al.

(10) Patent No.: US 9,288,604 B2
(45) Date of Patent: Mar. 15, 2016

(54) DOWNMIXING CONTROL

(75) Inventors: Roope Olavi Järvinen, Lempäälä (FI);
Kari Juhani Järvinen, Tampere (FI);
Juha Henrik Arrasvuori, Tampere (FI);
Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 654 days.

(21) Appl. No.: 13/557,724

(22) Filed: Jul. 25, 2012

(65) Prior Publication Data

US 2014/0029767 A1   Jan. 30, 2014

(51) Int. Cl.
*H04S 7/00* (2006.01)
*H04B 1/38* (2015.01)
*H04M 1/60* (2006.01)
*G06F 3/16* (2006.01)
*G06F 1/16* (2006.01)
*H04B 1/3827* (2015.01)

(52) U.S. Cl.
CPC .............. *H04S 7/303* (2013.01); *G06F 1/1694* (2013.01); *G06F 3/162* (2013.01); *G06F 3/165* (2013.01); *H04B 1/3833* (2013.01); *H04M 1/60* (2013.01); *H04M 2250/12* (2013.01); *H04R 2499/11* (2013.01); *H04S 2400/03* (2013.01)

(58) Field of Classification Search
CPC .. H04B 1/3833; H04M 1/60; H04M 2250/12; H04S 7/303; H04S 2400/03; H04R 2499/11; G06F 3/162; G06F 1/1694; G06F 3/165

USPC ................. 381/119, 1–21, 310; 455/313, 323
See application file for complete search history.

(56) References Cited

U.S. PATENT DOCUMENTS

| | | | | |
|---|---|---|---|---|
| 5,347,499 A | * | 9/1994 | Woo ................. | G11B 20/00992 369/4 |
| 6,114,774 A | * | 9/2000 | Fiegura ........................ | 307/9.1 |
| 7,180,500 B2 | | 2/2007 | Marvit et al. ................. | 345/156 |
| 7,433,716 B2 | | 10/2008 | Denton ....................... | 455/569.1 |
| 8,019,102 B2 | * | 9/2011 | Hatano ...................... | H04S 7/30 381/310 |
| 8,553,892 B2 | * | 10/2013 | Lindahl et al. ..................... | 381/1 |
| 2008/0205676 A1 | * | 8/2008 | Merimaa et al. .............. | 381/310 |
| 2009/0034766 A1 | * | 2/2009 | Hamanaka ............... | H04R 3/12 381/310 |
| 2011/0091056 A1 | * | 4/2011 | Nishizaki et al. ............. | 381/312 |
| 2012/0288126 A1 | * | 11/2012 | Karkkainen et al. .......... | 381/309 |
| 2013/0003998 A1 | * | 1/2013 | Kirkeby ............. | G05B 23/0235 381/300 |

FOREIGN PATENT DOCUMENTS

WO    WO 2011063857    *  6/2011

* cited by examiner

*Primary Examiner* — Vivian Chin
*Assistant Examiner* — David Ton
(74) *Attorney, Agent, or Firm* — Harrington & Smith

(57) ABSTRACT

An apparatus including an audio mixer configured to mix at least two audio channels of an audio signal; and a sensor configured to sense motion and/or orientation of the apparatus. The audio mixer is configured to change mixing of the at least two audio channels based, at least partially, on an output from the sensor regarding the sensed motion and/or orientation of the apparatus.

20 Claims, 5 Drawing Sheets

SENSING MOTION AND/OR ORIENTATION OF A HAND-HELD APPARATUS — 38

CHANGING MIXING OF AT LEAST TWO CHANNELS OF AN AUDIO SIGNAL BY A DOWN MIXER BASED, AT LEAST PARTIALLY, UPON THE SENSED MOTION AND/OR ORIENTATION OF THE APPARATUS — 41

DOWNMIXING CONTROL

BACKGROUND

1. Technical Field

The exemplary and non-limiting embodiments of the invention relate generally to downmixing and, more particularly, to adjusting an audio down mixer.

2. Brief Description of Prior Developments

Modern mobile devices may include a sensor which can be used to detect device orientation and motion, such as an accelerometer, a gyroscope or magnetometer.

Downmixing is a general term used for manipulating audio where a number of distinct audio channels are mixed to produce a lower number of channels. It is also known as folddown. Downmixing may be accomplished by use of an audio down mixer.

SUMMARY

The following summary is merely intended to be exemplary. The summary is not intended to limit the scope of the claims.

In accordance with one aspect, an apparatus is provided including an audio mixer configured to mix at least two audio channels of an audio signal; and a sensor configured to sense motion and/or orientation of the apparatus. The audio mixer is configured to change mixing of the at least two audio channels based, at least partially, on an output from the sensor regarding the sensed motion and/or orientation of the apparatus.

In accordance with another aspect, a method comprises sensing motion and/or orientation of a hand-held apparatus; and changing mixing of at least two channels of an audio signal by an audio mixer based, at least partially, upon the sensed motion and/or orientation of the apparatus.

In accordance with another aspect, a non-transitory program storage device readable by a machine is provided, tangibly embodying a program of instructions executable by the machine for performing operations, the operations comprising sending a mixed signal from an audio mixer of an apparatus to a sound transducer or to a sound processor and then to a sound transducer, where the mixed signal is formed from at least two channels of an audio signal; and changing mixing of the at least two channels of an audio signal by the audio mixer based, at least partially, upon a sensed motion and/or orientation of the apparatus.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
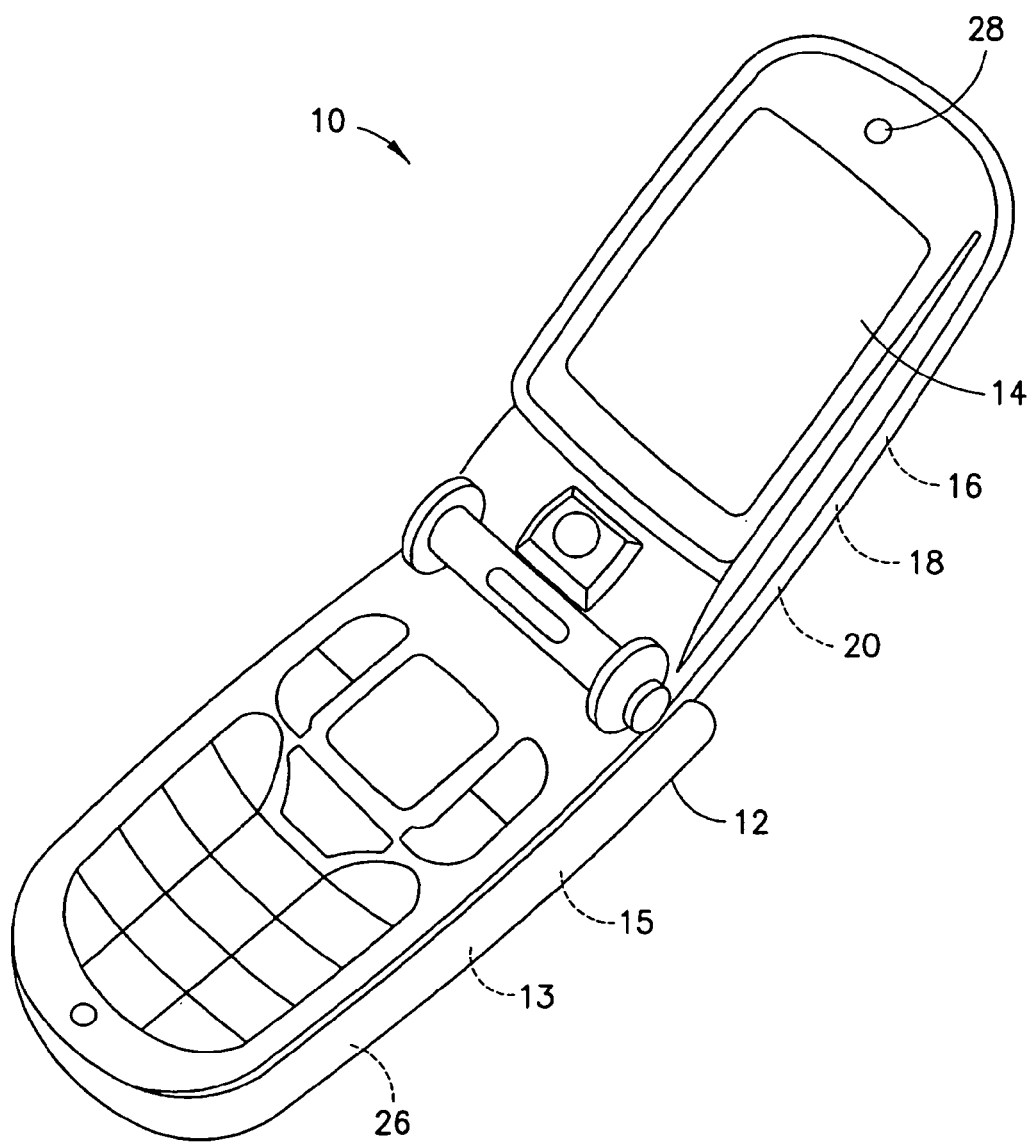
FIG. 1 is a perspective view of an example apparatus.

Referring to FIG. 1, there is shown a perspective view of an apparatus 10 according to an example embodiment. In this example the apparatus 10 is a hand-held portable apparatus comprising various features including a telephone application, Internet browser application, camera application, video recorder application, music player and recorder application, email application, navigation application, gaming application, and/or any other suitable electronic device application. The apparatus may be any suitable portable electronic device, such as a mobile phone, ultra mobile computer, smartphone, tablet, PDA, etc. for example.

Figure 2:
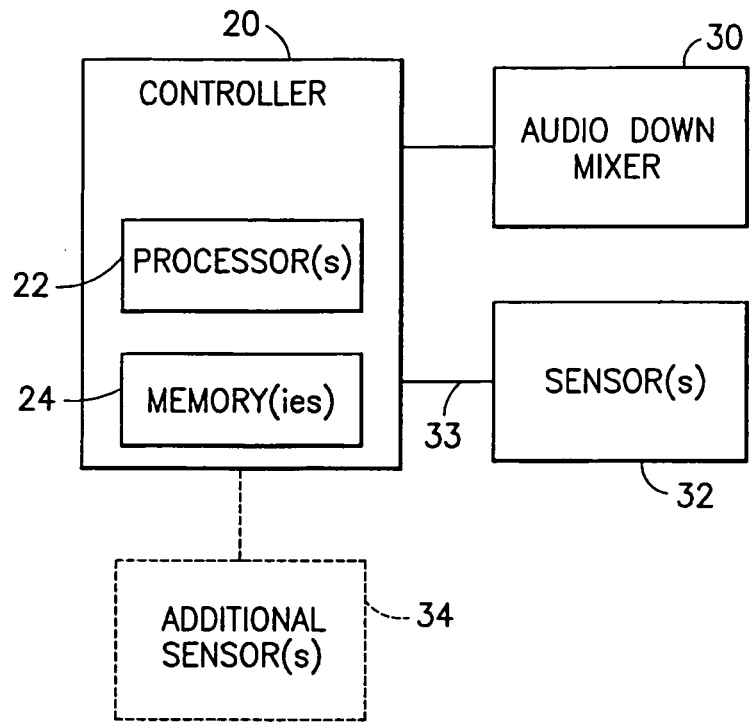
FIG. 2 is a diagram illustrating some components of the apparatus shown in FIG. 2.

The apparatus 10, in this example embodiment, comprises a housing 12, a touch screen display 14 which functions as both a display and a user input, and electronic circuitry 13 including a printed wiring board having at least some of the electronic circuitry thereon. The display 14 need not be a touch screen. The electronic circuitry can include, for example, a receiver 16, a transmitter 18, and a controller 20. Referring also to FIG. 2, the controller 20 may include at least one processor 22, at least one memory 24, and software. A rechargeable battery 26 is also provided. The apparatus 10 has an earpiece 28 comprising a transducer which is normally held near the user's ear. The apparatus 10 may also comprise another speaker, such as at the rear side of the apparatus 10 for speaker phone functionality for example.

Figure 2A:
FIG. 2A is a diagram illustrating incoming and output signals from the audio mixer.
Figure 3:
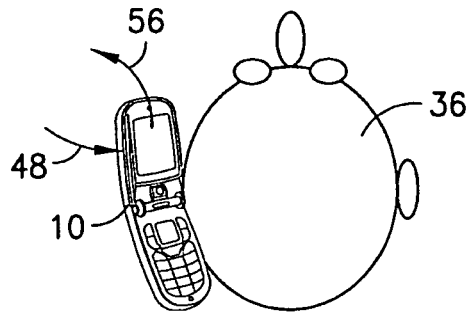
FIG. 3 is a diagram illustrating the apparatus shown in FIG. 1 being held to a user's ear.

As seen in FIG. 2, the apparatus 10 includes an audio mixer 30. In this example embodiment the audio mixer is a down mixer. However, in an alternate example the mixer might not be a down mixer. The down mixer 30 is adapted to mix at least two channels of an audio signal to form a resultant mixed audio signal. Referring also to FIG. 2A, the mixer 30 is shown with an incoming audio signal comprising a right channel 100R and a left channels 100L. The mixer 30 produces a resultant mixed audio signal 100M. The audio signal sent to the down mixer may comprise an audio signal received by the receiver 16 for example, or an audio signal stored in the memory 24 for example. The resultant mixed audio signal may be sent to the transducer of the earpiece 28. Referring also to FIG. 3, if using a normal mobile phone such as the apparatus 10 without a headset, the user 36 only listens to audio from one earpiece 28 and, therefore, only a monoaural signal is heard. Also, wireless headsets typically have only a single earpiece. So, again, only a monoaural signal is heard.

The audio down mixer 30 is configured to mix at least two channels of a multi-channel audio signal into a mixed audio signal which is subsequently sent to the transducer of the earpiece 28 for the user 36 to listen to. As one example, the mixer 30 may be adapted to mix a two channel stereo audio signal into a single mixed audio signal. As another example, the mixer 30 may be adapted to mix more than two channels into one or more channels, such as to a single mixed audio signal or 5.1 to stereo for example. The audio down mixer 30 is variable. This allows the resultant mixed audio signal to have one of a number of different mixtures or percentages of audio from the different channels. For example, if the audio signal is a stereo audio signal, the mixer 30 may have a setting where the resultant mixed signal is 50 percent from a right channel and 50 percent from a left channel. For this stereo audio signal example, the mixer 30 could be changed to a second different setting where the resultant mixed signal is 60 percent from a right channel and 40 percent from a left channel, or 40 percent from a right channel and 60 percent from a left channel. These are obviously only examples. The percentages could vary from zero percent up to 100 percent. Similar variable mixer setting could be provided for an audio signal having more than two channels. The controller 20 is configured to control the setting of the mixer 30.

As shown in FIG. 2, the apparatus 10 also includes at least one sensor 32. The sensor(s) 32 is configured to sense motion and/or orientation of the apparatus 10 and output an output signal 33 to the controller 20 corresponding to that sensed motion and/or orientation. The apparatus 10 may also comprise one or more additional sensors 34 connected to the controller 20. The sensor(s) 30 may include, for example, an accelerometer, a gyroscope and/or a magnetometer. The sensor(s) 30 are used to sense motion and/or orientation of the entire apparatus 10. A signal from the sensor(s) 30 is sent to the controller 20 to indicate motion of the apparatus or orientation of the apparatus or a change in motion or orientation. The controller 20 is configured to change the mixture setting of the audio down mixer 30 based upon the signal(s) from the sensor(s) 32 regarding the sensed motion or orientation of the apparatus 10.

In one type of example embodiment the apparatus 10 is configured to change a setting of the audio mixer 30 based upon motion of the apparatus 10. For example, if the apparatus 10 is quickly moved in a first direction, the controller 20 may be configured to change the setting of the mixer 30 10 percent in a first direction, such as 10 percent towards the right channel. Thus, if initially at a mixture setting of 50 percent right channel and 50 percent left channel, the mixer 30 would be changed to 60 percent right channel and 40 percent left channel. In this example, if the apparatus 10 is quickly moved in an opposite second direction, the controller 20 may be configured to change the setting of the mixer 30 10 percent in an opposite direction, such as 10 percent towards the left channel. Thus, if initially at 50 percent right channel and 50 percent left channel, the mixer 30 would be changed to 40 percent right channel and 60 percent left channel. This is only an example, but the example illustrates how a sensed motion can be used to change the audio down mixer 30.

Figure 6:
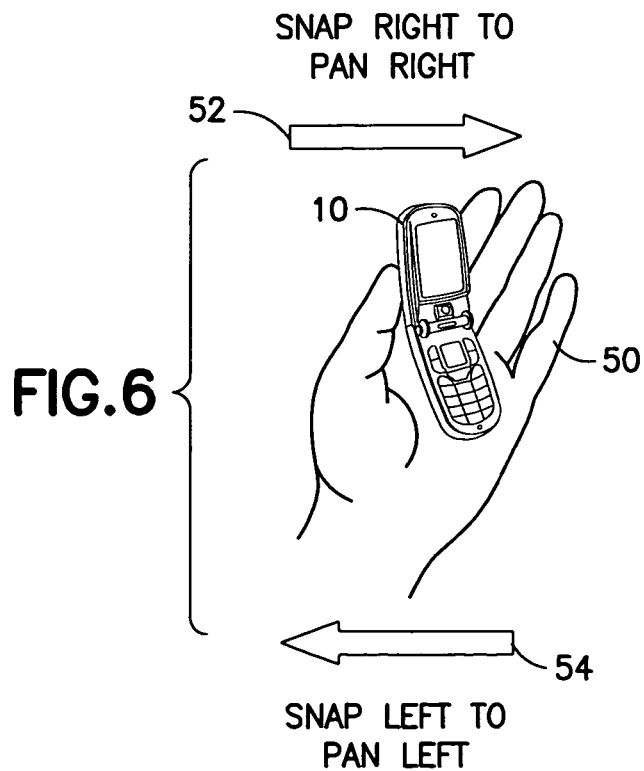
FIG. 6 is a diagram illustrating motion of the device shown in FIG. 1 by a hand of the user.

Motion sensors can capture the motion of the apparatus. This sensor information may be utilized in the implementation of features described herein. For example, a snapping motion towards left or right can be used as a signal to control where the panning of the stereo signal would be placed. Referring also to FIG. 6, the apparatus 10 is shown in a hand 50 of the user 36. The apparatus 10 may be configured such that if the hand 50 and apparatus 10 are snapped to the right as indicated by arrow 52, the mix setting of the down mixer 30 is changed a predetermined amount (such as 10 percent for example) towards the right channel from its current setting. For example, if the current setting is 50 percent right channel and 50 percent left channel, a right snap would result in the mixer setting changing to 60 percent right channel and 40 percent left channel. If the user does this again, the mixer setting changes to 70 percent right channel and 30 percent left channel. This may be repeated as often as the user 36 desires. The apparatus 10 may be configured such that if the hand 50 and apparatus 10 are snapped to the left as indicated by arrow 54, the mixer setting of the down mixer 30 is changed a predetermined amount (such as 10 percent for example) towards the left channel from its current setting. For example, if the current setting is 70 percent right channel and 30 percent left channel, a left snap would result in the mixer setting changing to 40 percent right channel and 60 percent left channel. If the user does this again, the mixer setting changes to 50 percent right channel and 50 percent left channel.

If the center panning is defined as 50-50 ratio, each snap could pan the stereo image towards the direction of the snap such as, for example, 30-70, 10-90 etc. ratio. Eventually, this may lead to only one channel being downmixed into the resultant mixed mono signal. This kind of motion can easily be performed by the user 36 without having to interact with the main user interface (UI) of the apparatus 10 in a conventional way.

As an alternative example, the gesture for controlling panning may be a combination of moving the device in two or even three axes. For example, snapping the apparatus 10 on a left/right axis to control panning (as described above with respect to FIG. 6), and also turning the apparatus 10 (by twisting the wrist). This twist motion might be used to lock the new panning setting, so the panning doesn't change by accidental movements of the apparatus for example. Other alternative or additional gestures could be used as well. The apparatus 10 may be configured to allow the user 36 the possibility to teach the apparatus 10 a preferred gesture to trigger the stepwise panning function. Rather than a stepwise panning, the panning may be continuous until stopped. For example, panning in a direction percent every 2 seconds until stopped by an apparatus motion to indicate stop panning. A special gesture such as turning the device up-side-down and back could, for example, skip the gradual panning and immediately swap between the two channels.

These gestures, and their control over the down mixer, may be shown on the device display 14 so the user may learn them. For example, the illustration shown in FIG. 6 could be shown on the display 14. The current state of the mixing balance may be represented to the user through visual means. For example, the current state of the mixing balance may be represented to the user through a simple graphical element on the display 14 which depicts the proportion of the signal weighting of left and right channels. Audible indication of the current state of the mixing balance is also possible to make it unnecessary to take a look at the display 14 during the conversation.

Rather than motion, or in addition to motion, orientation of the apparatus 10 may be used to at least partially control the mixer 30. Thus, in one type of example embodiment the apparatus 10 may be configured to change a setting of the audio mixer 30 based upon sensed orientation of the apparatus 10 as determined by an orientation sensor. For example, if orientation of the apparatus 10 is changed, such as tilted in a first direction, the controller 20 may be configured to change the setting of the mixer 30 20 percent in a first direction, such as 20 percent more of the right channel. Thus, if initially at 50 percent right channel and 50 percent left channel, the mixer 30 would be changed to 70 percent right channel and 30 percent left channel. In this example, if the apparatus 10 is tilted in an opposite second direction, the controller 20 may be configured to change the setting of the mixer 30 20 percent in an opposite direction, such as 20 percent towards the left channel. Thus, if initially at 50 percent right channel and 50 percent left channel, the mixer 30 would be changed to 30 percent right channel and 70 percent left channel. This is only an example, but the example illustrates how a sensed orientation can be used to change the audio down mixer 30.

Figure 4A:
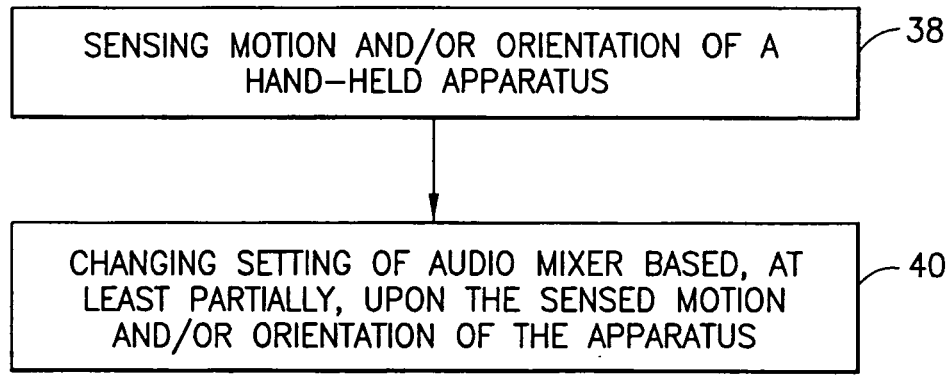
FIG. 4A is a diagram illustrating an example method.
Figure 4B:
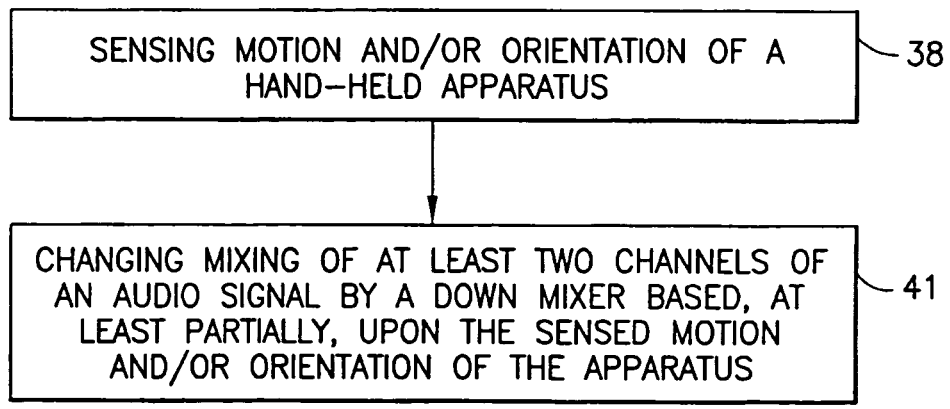
FIG. 4B is a diagram illustrating an example method.

Referring to FIG. 4A, an example method may comprise sensing motion and/or orientation of a hand-held apparatus 10 as indicated by block 38, and changing a setting of an audio mixer based, at least partially, upon the sensed motion and/or orientation of the apparatus as indicated by block 40. Referring to FIG. 4B, an example method may comprise sensing motion and/or orientation of a hand-held apparatus 10 as indicated by block 38, and changing mixing of at least two channels of an audio signal by a down mixer based, at least partially, upon the sensed motion and/or orientation of the apparatus as indicated by block 41.

Features as described herein may be used for listening and controlling the downmix of an audio signal, such as a stereophonic signal for example, using a device capable of rendering only monoaural audio output. For example, if using a normal mobile phone without a headset, the user only listens to audio from one earpiece and, therefore, only a monoaural signal is heard. Stereo phone calls cannot be fully utilized with a device only capable rendering mono audio. This may hinder the consumer adoption of stereo calls when the technology is introduced to the market.

Stereophonic mobile radio telephone phone calls are envisioned to become possible in the future. However, using a mobile phone in a traditional way, by holding it against one's ear, does not automatically allow any benefit from having a stereo phone call. This is because the acoustic output is limited to monophonic from the single earpiece 28. Features as described herein may be used as a method and user interface of controlling audio downmix in a mobile phone having a single earpiece.

Downmix control can also be useful in other use cases of stereo phone calls. One example may comprise a situation where two discrete audio signals are transferred over a stereo line. One channel could contain music and the other channel could speech. Therefore, controlling the downmix ratios of individual channels would also result in controlling which content the end user prefers hearing more.

Stereophonic phone calls through mobile networks are not possible yet. Some VoIP solutions have stereo possibility, but their normal usage is not in mobile phone domain, and there is no known solution that would provide the same functionality as described herein.

With features as described herein, gestures and/or motion may be used to perform user interface (UI) related actions to control downmix of stereophonic signals. An example method may comprise allowing the end user to control mixing of left and right channels of an incoming stereo signal by making a predefined gesture. The control may be done at the receiving end (at apparatus 10) by the user 36.

Figure 5:
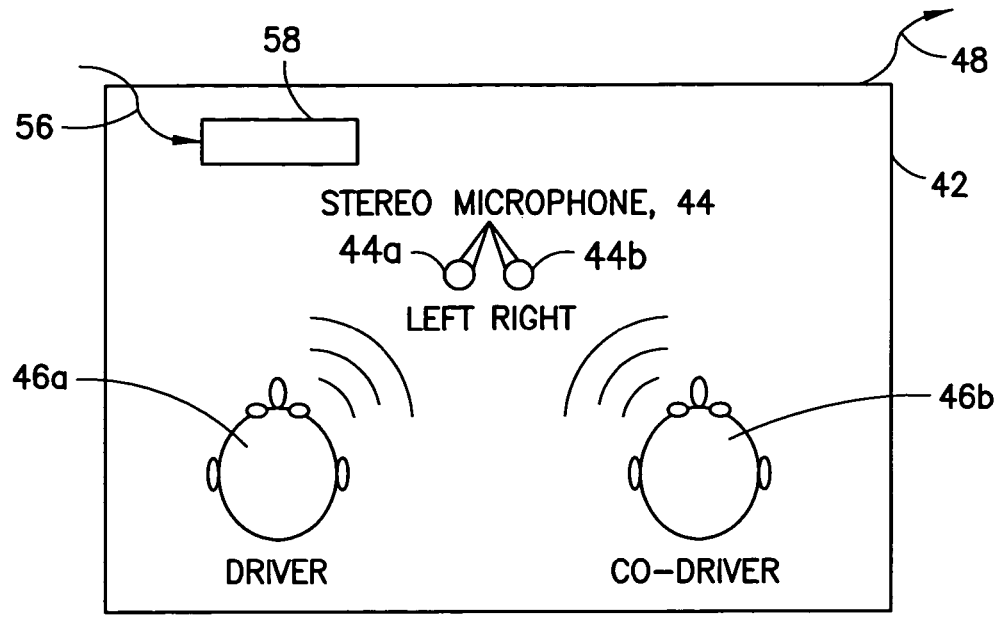
FIG. 5 is a diagram illustrating a device used to send a wireless multi-channel audio signal to the apparatus shown in FIG. 1.

Referring also to FIG. 5, an example of one use case will be described in regard to a stereophonic phone conversation. FIG. 5 shows an automobile 42 having a car phone with a stereo microphone 44. The microphone 44 has left and right microphones 44a, 44b. There are two people 46a, 46b sitting in the car 42; both taking part in a conversation with the user 36 shown in FIG. 3. The user 36 is holding the phone 10 on his ear in a traditional way. As seen in FIG. 5, a signal 48 is sent from the car phone of the automobile 42 and received by the apparatus 10 shown in FIG. 3. The signal 48 is a multichannel audio signal including channels 100R and 100L (see FIG. 2A) created from the sound received from the two microphones 44a, 44b. The down mixer 30 is able to create a resultant mixed audio signal (such as 100M shown in FIG. 2A for example) and send that mixed audio signal to the transducer of the earpiece 28.

While the call having the signal 48 would enable stereophonic reception and listening for an apparatus with more than one sound transducer, the apparatus 10 only has the one earpiece 28. However, the user 36 can hear downmixed audio through the earpiece 28. With features as described herein, the user 36 may control how this downmix is done. For example, if the front seat passenger 46b speaks at lower volume than the driver 46a, in a conventional mobile phone it may be hard to adjust volume optimally so both speakers 46a, 46b are heard with best possible volume. Having control over how downmixing is done solves the problem because the user 36 may put more emphasis on front seat passenger's side of the signal to adjust for the lower volume of the passenger 46b. In other words, the user 36 may change the setting of the mixer 30 to put more emphasis on the sound received by the microphone 44b (channel 100L) and less emphasis on the sound received by the microphone 44a (channel 100R).

Control on how representation of the incoming stereo signal is done may also be beneficial even if the apparatus 10 is stereo-capable. The same method of controlling through device gesture (motion or location of the apparatus 10) may be used to emphasize one side of the stereo field more; thus making one channel louder in comparison to another channel. As above, this may be used to make a person talking on the other end (46b for example) be heard louder to the user 36. This may additionally or alternatively be used to put emphasis on the side of the sound field which has more interesting content to the user 36. Using the sensor(s) 32 in the mobile phone 10 to control the panning of the stereo image is a novel way which allows the user to benefit more from stereo calls.

In some use cases it might be useful to have indication of a mixing level selected by the other side relayed to the other side through signaling. For example, as shown in FIG. 5 the system could use the display 58 to indicate the mixing level selected by the user 36. In particular the apparatus 10 could be configured to send the signal 56 indicating the mix setting of the down mixer 30. As another alternative, the selected level of the down mixer 30 may be indicated through LEDs with varying brightness placed on the microphones 44a, 44b or some other indicator in the dashboard of the car 42. In this example, the people 46a, 46b sitting in the car may see the mix setting of the mixer 30 which the user 36 is trying to emphasize. The user(s) 46a, 46b may be able to use this information to manually adjust capture balance of the stereo microphones 44a, 44b. Alternatively, or additionally, the microphone 44 may be able to use this information to automatically adjust capture balance of the stereo microphones 44a, 44b.

Figure 7:
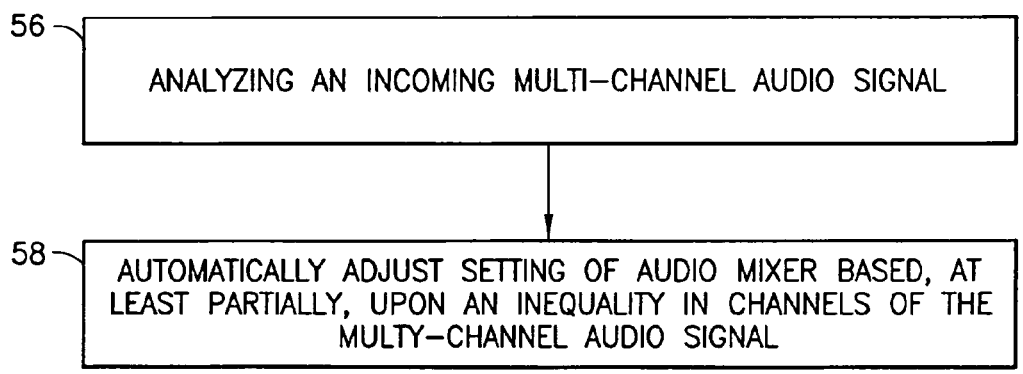
FIG. 7 is a diagram illustrating an example method.

In one type of example embodiment the apparatus may be configured for an automatic signal level detection of separate sound sources. The apparatus 10 may be configured to analyze the incoming stereo audio signal 48 and automatically process the audio accordingly. In analysis the apparatus 10 may detect that one sound source or other channel of the multi-channel signal 48 has constantly lower energy in comparison to the other(s). With this information, the mixer 30 and/or controller 20 may be configured to automatically balance channels so that their perceived energies are equal (or other predetermined setting is provided). Thus, as illustrated by FIG. 7, an example method may comprises analyzing an incoming multi-channel audio signal as indicated by block 56, and automatically adjusting a setting of the audio mixer based, at least partially, upon an inequality in channels of the multi-channel audio signal as indicated by block 58.

This automatic balance adjusting feature may be a user selectable feature in the apparatus. This automatic balance adjusting feature may be singular, such as just once at the start of a multi-channel telephone call for example, or the automatic balance adjusting feature may be running constantly during the call and adjusting balance when necessary, or periodic such as once every 2 seconds for example. It is also possible to implement certain user selectable modes or profiles which allow the user to easily select his preferred mixing behavior (e.g. "Telco" mode where it may be assumed that incoming audio contains speech of one or more people).

In one type of example embodiment, the same principles could be used to control other features of audio signals. For example, features as described herein may be used to control how ambience signals and direct signals are mixed and rendered in the apparatus 10. It is possible to separate the direct signals from ambient signals from audio. In some cases it may be beneficial for the user 36 to set the mixing level of those components. For example, a person at a first side of a phone call may be bird watching at an interesting site with some special bird sounds he would like another person on a second side of a phone call to hear. In current mobile phones, by default, ambience is more likely to be suppressed and emphasis put on speech near the microphone. The apparatus 10 at the second side may be configured to allow the user 36 to adjust an incoming audio signal to place more weight on the ambience portion of the incoming signal and less weight on the direct portion of the incoming signal. As with earlier embodiments, signaling and indication may be used between the parties in the telephone call to see what the other side wants to hear (what the mixer settings are), and how the capturing and rendering side (the first side) should be configured to assist. In this use case the same kind of gesture may be used to control the phone at the first side (the capturing side) as well. Thus, an advantage is the possibility to control how ambient and direct signals are captured and rendered. By providing a way to control the ratio of mixing, the apparatus may be able to adjust mixing to produce the optimal audio signal for all situations.

Another example is in regard to how music is rendered. For example, consider a use case where a quartet of singers are singing, and their performance is recorded by a stereo microphone. The same control method described above may be used to make each of the four singers appear louder by emphasizing one side of the stereo field more, if so desired by the user. An advantage of the features described herein is the ability to easily control how channels of a multi-channel signal are panned and mixed. This is not only useful in scenarios such as described with reference to FIGS. 3 and 5, but also with possible future usages of stereo phone calls, where two channels may include discrete kinds of data, such as music and speech for example. The same method could then be used to control the mix ratio between music and speech which ends up in the downmix.

Thus, an advantage of features as described herein is that it may also be useful to have an easy way to control the mixing of music or other content. For example, some instruments may be placed more on one side of the mix. Also, some audio tracks may have two separate contents on left and right channels. For example, background music and commentary. With features as described herein, it would be very easy to adjust balance according to the preference of the user 36 merely by motion and/or orientation of the apparatus 10.

Figure 8:
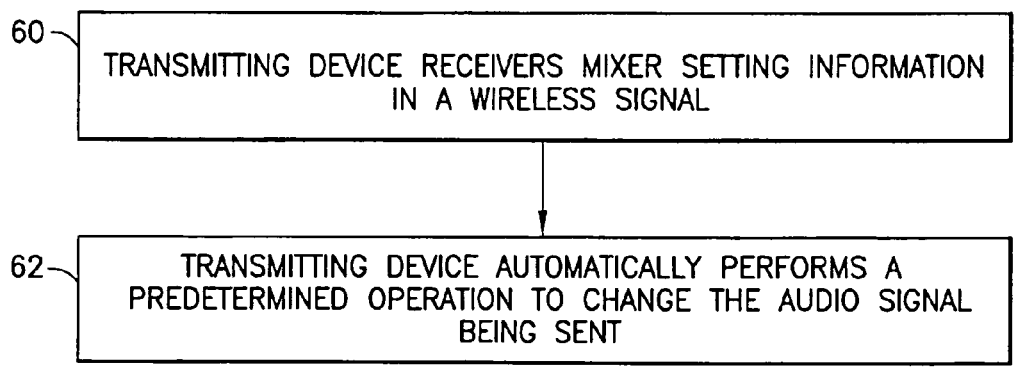
FIG. 8 is a diagram illustrating an example method.

In one type of example embodiment, when a channel is not played on the apparatus 10, the system may be configured such that this non-played channel is not transmitted at all between the two devices (from another device to the apparatus 10). Alternatively, the non-played channel may be transferred at a much lower data rate, and the channel that is being listened to on the apparatus 10 may correspondingly be transmitted at a higher data rate. With this type of example a signal, similar to signal 56 may be transmitted from the apparatus 10 to the other device to indicate which channel is being played and which channel is not being played. The other device may be configured to take a predetermined action based upon this signal. An example of the predetermined action may be to stop sending the non-played channel. As another example, if a first channel is panned by the user 36 to be played at a lower volume than a second channel, the data rate for transmitting this first channel may be lowered by the transmitting device. Thus, as illustrated by FIG. 8, in one type of example method the transmitting device may receive mixer setting information such as in signal 56 as illustrated by block 60, and the transmitting device may automatically perform a predetermined operation to change the audio signal being sent as indicated by block 62, such as no longer sending one channel for example.

Figure 2B:
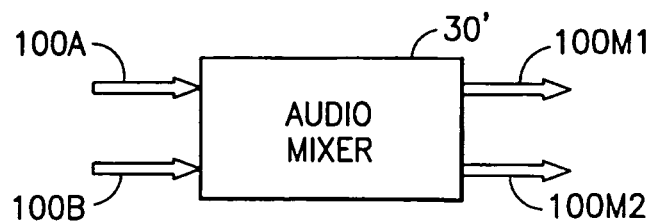
FIG. 2B is a diagram illustrating incoming and output signals from an alternate form of audio mixer.

It should be noted that features of the invention are not limited to a down mixer. Referring also to FIG. 2B, an audio mixer may be provided which receives two or more channels (100A and 100B for example) and outputs a same number of channels (100M1 and 100M2) for example but with different properties as adjusted by the mixer.

An example embodiment may be provided in an apparatus 10 comprising an audio mixer 30 configured to mix at least two audio channels of an audio signal 48; and at least one sensor 32 configured to sense motion and/or orientation of the apparatus 10, where the audio mixer 30 or 30' is configured to change mixing of the at least two audio channels based, at least partially, on an output from the at least one sensor 32 regarding the sensed motion and/or orientation of the apparatus 10.

In one type of example embodiment, an apparatus comprises an audio mixer configured to mix at least two audio channels of at least one audio signal; and at least one sensor configured to sense motion and/or orientation of the apparatus, where the audio mixer is configured to change mixing of the at least two audio channels based, at least partially, on an output from the at least one sensor regarding the sensed motion and/or orientation of the apparatus. The at least one audio signal may be two or more audio signals for example. At least one audio signal may indicate that there is at least one call, however, there could also be two or more calls in which case the controlling may be done differently. For example, each sensor on the device may be mapped to control each audio signal. In one example scenario the user 36 may be in a conference call with two or more other telephones. The apparatus 10 may be configured to mix/adjust the audio signals from the incoming telephone calls to adjust the volume of the calls. Thus, the sound of a loud person talking on one channel from a first phone may be reduced by the phone 10 based (at least partially) on motion orientation of the phone by the user 36, and the sound of a less-loud person talking on another channel from a second phone may be increased by the phone 10 by the phone 10 based (at least partially) on motion and/or orientation of the phone 10 by the user 36.

The "at least two audio channels" may be stereo or 5.1 surround for example. However, features as described herein are not limited to stereo and 5.1 surround sound. In one example embodiment, mixing may be changed, at least partially, by another entity rather than the audio mixer. The mixing can be controlled by another person than who is holding the device playing (and mixing) the audio. It may, for example, be the co-driver 46b which controls the mixing with his device. The mixing may just be done on another user's device. In other words, as an example with reference to FIG. 5, a first device (such as a personal mobile phone of the user 46b) may provide control (mixing) data to a second device (such as a person mobile phone of the user 46a) that implements the mixing.

The audio mixer may be a down mixer. The audio signal may be a stereo audio signal, where the at least two audio channels comprise a right channel and a left channel, and where the down mixer is configured to mix the right channel and the left channel into a mixed audio signal. The audio mixer may be configured to mix a direct signal and an ambience signal, as the at least two audio channels, to form a mixed audio signal. The audio mixer may be variable to change a ratio of the at least two audio channels in a resultant mixed audio signal from the audio mixer. The apparatus may further comprise means for automatically adjusting the ratio based upon at least one predetermined aspect of the audio signal. The apparatus may further comprise means for preventing the audio mixer from changing the mixing of the at least two audio channels, where the means for preventing comprises at least one of the sensors. The at least one sensor may comprise an accelerometer, a gyroscope and/or a magnetometer. The apparatus may further comprise a wireless transmitter, where the apparatus is configured to send a signal from the wireless transmitter comprising information regarding a mix setting of the audio mixer.

An example method may comprise sensing motion and/or orientation of a hand-held apparatus 10; and changing mixing of at least two channels of an audio signal by an audio mixer 30 based, at least partially, upon the sensed motion and/or orientation of the apparatus. A sensor 32 inside the apparatus may be used to sense the motion and/or orientation of the apparatus. The audio mixer may be a down mixer, where changing the mixing comprises changing a ratio of the at least two channels in a resultant mixed audio signal from the down mixer. The audio signal may be a stereo audio signal, where the at least two audio channels comprise a right channel and a left channel, and where the down mixer mixes the right channel and the left channel into a mixed audio signal. The audio mixer may mix a direct signal and an ambience signal, as the at least two audio channels, to form a mixed audio signal. The audio mixer may vary a ratio of the at least two audio channels in a resultant mixed audio signal from the audio mixer. The method may further comprise automatically adjusting a ratio of the at least two channels relative to each other based upon at least one predetermined aspect of the audio signal. The method may further comprise preventing the audio mixer from changing the mixing of the at least two audio channels based upon a signal from at least one of the sensors. The method may further comprise sending a signal from a wireless transmitter of the apparatus, where the signal comprises information regarding a mix setting of the audio mixer.

In one type of example, a non-transitory program storage device (such as memory 24 for example) readable by a machine, tangibly embodying a program of instructions executable by the machine for performing operations, may comprise operations such as sending a mixed signal from an audio mixer of an apparatus to a sound transducer, or a sound processor and then the sound transducer, where the mixed signal is formed from at least two channels of an audio signal; and changing mixing of the at least two channels of an audio signal by the audio mixer based, at least partially, upon a sensed motion and/or orientation of the apparatus. The operations may further comprise sending a signal from a wireless transmitter of the apparatus, where the signal comprises information regarding a setting of the audio mixer.

Features as described herein are not limited to use with only an audio mixer. Features as used herein may be used with any suitable audio/video channel parsing or channel filtering or channel selecting device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   a receiver configured to receive a telephone call audio signal, where the telephone call audio signal comprises at least two audio channels;
   an audio mixer configured to mix the at least two audio channels of the telephone call audio signal to produce a downmixed audio signal; and
   at least one sensor configured to sense motion and/or orientation of the apparatus based on a user interfacing with the at least one sensor, comprising motion and/or gesture by the user, for controlling downmixing by the audio mixer,
   where the audio mixer is configured to change mixing of the at least two audio channels based, at least partially, on an output from the at least one sensor regarding the sensed motion and/or orientation of the apparatus, from the motion and/or gesture by the user as the interfacing, to at least partially control the downmixing by the audio mixer to produce the downmixed audio signal.

2. An apparatus as in claim 1 where the audio mixer is a down mixer.

3. An apparatus as in claim 2 where the telephone call audio signal is a stereo audio signal, where the at least two audio channels comprise a right channel and a left channel, and where the down mixer is configured to mix the right channel and the left channel into the downmixed audio signal.

4. An apparatus as in claim 1 where the audio mixer is configured to mix a direct signal and an ambience signal, as the at least two audio channels, to form the downmixed audio signal.

5. An apparatus as in claim 1 where the audio mixer is variable to change a ratio of the at least two audio channels in the downmixed audio signal from the audio mixer.

6. An apparatus as in claim 5 where the apparatus further comprises means for automatically adjusting the ratio based upon at least one predetermined aspect of the telephone call audio signal.

7. An apparatus as in claim 1 further comprising means for preventing the audio mixer from changing the mixing of the at least two audio channels, where the means for preventing comprises at least one of the at least one sensor.

8. An apparatus as in claim 1 where the at least one sensor comprises an accelerometer, a gyroscope and/or a magnetometer.

9. An apparatus comprising:
   an audio mixer configured to mix at least two audio channels of at least one audio signal to produce a downmixed audio signal;
   at least one sensor configured to sense motion and/or orientation of the apparatus based on a user interfacing with the sensor, comprising motion and/or gesture by the user, for controlling downmixing by the audio mixer; and
   a wireless transmitter,
   where the audio mixer is configured to change mixing of the at least two audio channels based, at least partially, on an output from the at least one sensor regarding the sensed motion and/or orientation of the apparatus, from the motion and/or gesture by the user as the interfacing, to at least partially control the downmixing by the audio mixer to produce the downmixed audio signal, where the apparatus is configured to send a signal from the wireless transmitter comprising information regarding a mix setting of the audio mixer.

10. A method comprising:

receiving by a receiver of a hand-held apparatus a telephone call audio signal, where the telephone call audio signal comprises at least two audio channels;

sensing motion and/or orientation of the hand-held apparatus based on a user interfacing with at least one sensor, comprising motion and/or gesture by the user, for controlling an audio mixer; and changing mixing of the at least two channels of the telephone call audio signal by the audio mixer, including changing downmixing of the at least two channels based, at least partially, upon the sensed motion and/or orientation of the hand-held apparatus, where the audio mixer is configured to mix the at least two audio channels to produce a downmixed audio signal based, at least partially, on an output from the at least one sensor regarding the sensed motion and/or orientation of the hand-held apparatus, from the motion and/or gesture by the user as the interfacing, to at least partially control downmixing by the audio mixer to produce the downmixed audio signal.

11. A method as in claim 10 where the at least one sensor comprises a sensor inside the hand-held apparatus which senses the motion and/or orientation of the hand-held apparatus.

12. A method as in claim 10 where the audio mixer is a down mixer, and where changing the mixing comprises changing a ratio of the at least two channels in the downmixed audio signal from the down mixer.

13. A method as in claim 12 where the telephone call audio signal is a stereo audio signal, where the at least two audio channels comprise a right channel and a left channel, and where the down mixer mixes the right channel and the left channel into the downmixed audio signal.

14. A method as in claim 10 where the audio mixer mixes a direct signal and an ambience signal, as the at least two audio channels, to form the downmixed audio signal.

15. A method as in claim 10 where the audio mixer varies a ratio of the at least two audio channels in the downmixed audio signal from the audio mixer.

16. A method as in claim 10 further comprising automatically adjusting a ratio of the at least two channels relative to each other based upon at least one predetermined aspect of the telephone call audio signal.

17. A method as in claim 10 further comprising preventing the audio mixer from changing the mixing of the at least two audio channels based upon a signal from at least one of the at least one sensor.

18. A method as in claim 10 further comprising sending a signal from a wireless transmitter of the apparatus, where the signal comprises information regarding a mix setting of the audio mixer.

19. A non-transitory program storage device readable by a machine, tangibly embodying a program of instructions executable by the machine for performing operations, the operations comprising:

receiving by a receiver of a hand-held apparatus a telephone call audio signal, where the telephone call audio signal comprises at least two audio channels;

sending a mixed signal from an audio mixer of the hand-held apparatus to a sound transducer or to a sound processor and then to the sound transducer, where the mixed signal is formed from at least two channels of the telephone call audio signal, where the mixed signal is a downmixed audio signal; and changing mixing of the at least two channels of the telephone call audio signal by the audio mixer, including changing downmixing by the audio mixer, based, at least partially, upon a sensed motion and/or orientation of the hand-held apparatus, where the audio mixer is configured to mix the at least two audio channels of the telephone call audio signal to produce the downmixed audio signal based, at least partially, on an output from at least one sensor regarding the sensed motion and/or orientation of the hand-held apparatus, from motion and/or gesture by a user interfacing with the at least one sensor, to at least partially control downmixing by the audio mixer to produce the downmixed audio signal.

20. A device as in claim 19 where the operations further comprise sending a signal from a wireless transmitter of the hand-held apparatus, where the signal comprises information regarding a setting of the audio mixer.

* * * * *